Feb. 15, 1927.
R. KING
SAFETY CONNECTING HOOK FOR DERRICKS
Filed May 27, 1926
1,617,763
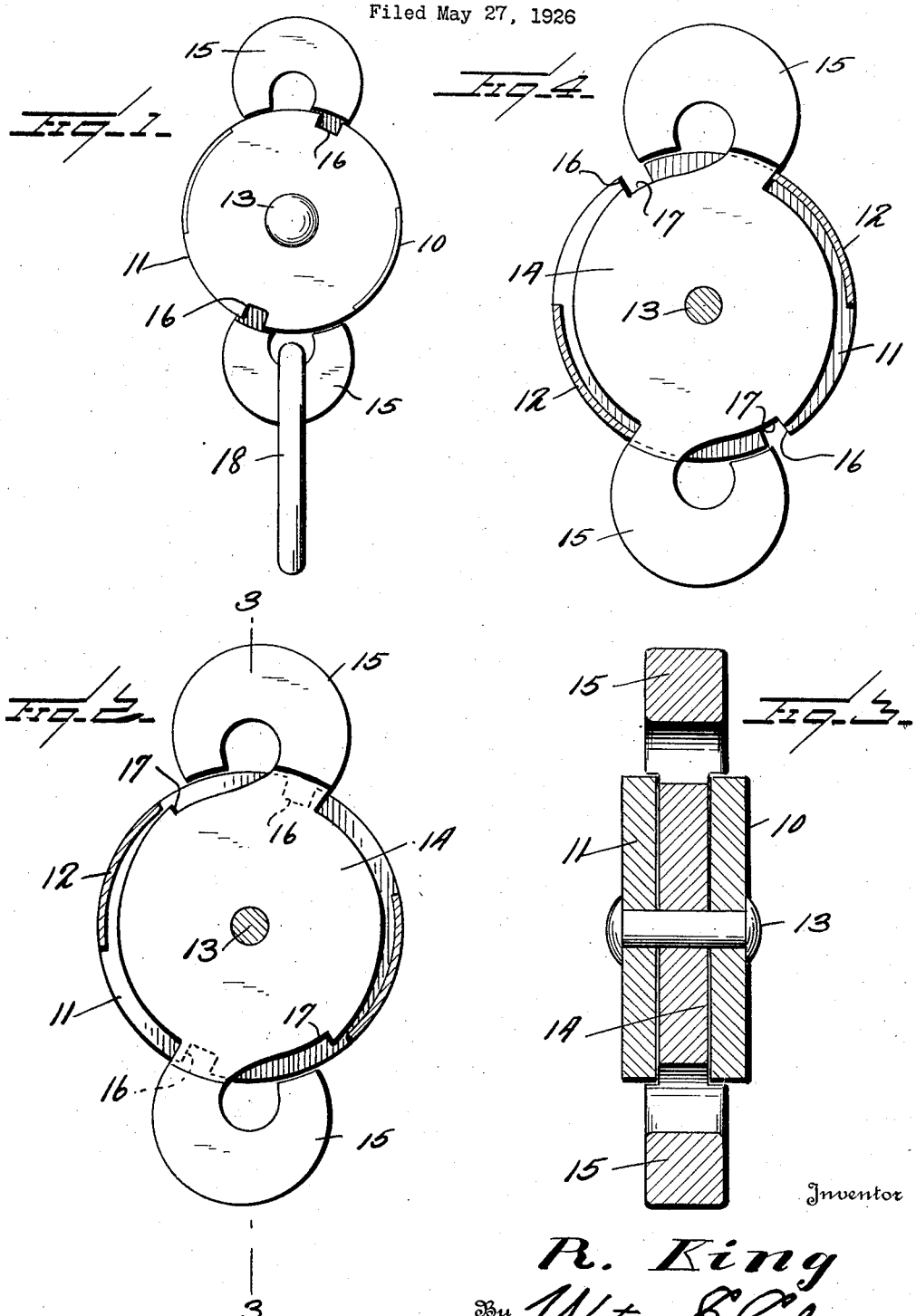
Inventor
R. King
By Watson E. Coleman
Attorney Patented Feb. 15, 1927.

1,617,763

UNITED STATES PATENT OFFICE.

ROBERT KING, OF PENDLETON, OREGON.

SAFETY CONNECTING HOOK FOR DERRICKS.

Application filed May 27, 1926. Serial No. 112,082.

This invention relates to hooks used for connecting chains, cables and other like connections in derricks, hoists and under like circumstances, and the general object of the invention is to provide a device of this character so constructed that the links of a chain or the bights of a cable may be engaged with the connecting member in such manner as not to be accidentally detached.

A further object is to provide a device of this character so formed that the chain or cable may be readily engaged with the opposed hooks of the device but cannot become accidentally disengaged therefrom, which is very simple and which may be cheaply made and easily applied.

My invention is illustrated in the accompanying drawings wherein:—

Figure 1 is a side elevation of my improved connector;

Fig. 2 is a vertical sectional view thereof;

Fig. 3 is a section on the line 3—3 of Figure 2;

Fig. 4 is a like view to Figure 2 and showing the hooks in a position to permit removal of the ring or link.

Referring to these drawings 10 designates the block or body of the device consisting of two laterally disposed plates or side walls 11, held in spaced relation to each other by the peripheral webs 12 which may be attached to the side walls or formed integral therewith as desired. Passing through the side walls is a pin 13. Disposed between the side walls is a disk 14 having a central aperture through which the pin 13 is passed and this disk at diametrically opposite points is formed with the hooks 15 which are reversed with relation to each other. The bills of these hooks are wider than the space between the side walls 11 and the extremities of the bills approximate the peripheral surfaces of the side walls 11.

The side walls 11 at nearly diametrically opposite points are provided with the notches 16, these notches being slightly tangential to a circle concentric to the axis of the disk 14. The disk 14 is cut away at a point slightly in advance of the bills of the hooks as at 17, and this cut away portion is on a level with the bottoms or inner ends of the notches 16. Shown as coacting with each hook is a ring 18 which may represent the bight on the end of a cable or the end link of a chain, a shackle or like element. Of course, the strain on the cable, shackle or chain will tend to keep the link 18 away from the cut away portion 17 at the base of each hook and under normal circumstances there is no possible chance for the ring or link 18 to escape from its engagement with the hook but if it should be desired to disengage the ring 18 from its corresponding hook, the disk is turned so as to bring the cut away portion of the disk 14 into conjunction with the notches 16 as shown in Figure 4 and under these circumstances the ring or link may be forced into these notches by hand and then the bill of the hook will pass outward of the ring and the ring may be readily detached. Obviously the ring may be inserted by the same operation. It will be seen that any strain placed upon the ring in any direction, while it may pull the disk 14 with its hook 15 will, at the same time, tend to prevent the entrance of the ring into the notches 16 without which it is impossible to release the ring from its engagement with the hook.

Obviously this device might be made either in large or small sizes and of any suitable material. I do not wish to be limited to the details of construction as it is obvious that these might be varied in many ways without departing from the spirit of the invention as defined in the appended claims.

I claim:—

1. A connector of the character described including a body having opposed side walls, a disk disposed between said side walls and oscillatably mounted therein, the disk having a periphery concentric to the peripheries of said side walls and having a hook projecting beyond the side walls, the hook having a bill, the extremity of which approximates the peripheries of the side walls, the disk at a point beneath the bill being cut away, the edge face of the cut away portion extending inward toward the center of the disk and then outward at an inclination and intersecting the base of the hook, the side walls at opposite points being formed with notches with which the cut away portion of the disk is adapted to register to thereby permit the removal of the ring engaged with said hook.

2. A device of the character described including a body having opposed connected side walls, a disk disposed between said side walls and oscillatably mounted therein, said disk having a periphery concentric to the periphery of the side walls and having a hook projecting beyond the side walls, the hook having a bill greater in width than the distance between the side walls and the extremity of the bill approximating the peripheries of the side walls, said disk at a point beneath the bill being cut away, the side walls at opposite points being formed with notches with which the cut away portion of the disk is adapted to register to thereby permit the removal of the ring engaged with said hook.

3. A device of the character described comprising a body formed to provide opposed circular side walls connected at intervals, a pin extending axially through said side walls, a disk-like member disposed between said side walls and supported by said pin and having a periphery approximately concentric to the periphery of the side walls and formed at diametrically opposite points with radially projecting hooks having their bills extended in opposite directions, each bill having a width greater than the distance between the side walls and each bill approximating the peripheries of the side walls, and the side walls at diametrically opposite points being formed with opposed notches and the disk-like member immediately inward of the bill of the hook being reduced in diameter, said reduced portion being adapted to align with said notches to thereby permit the detachment of the ring engaged with said hook.

In testimony whereof I hereunto affix my signature.

ROBT. KING.